United States Patent
Vujcic

(10) Patent No.: US 8,406,781 B2
(45) Date of Patent: Mar. 26, 2013

(54) DETERMINATION OF USER EQUIPMENT ANTENNA CAPABILITY

(75) Inventor: Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/147,362

(22) PCT Filed: Nov. 12, 2009

(86) PCT No.: PCT/KR2009/006647
§ 371 (c)(1),
(2), (4) Date: Aug. 1, 2011

(87) PCT Pub. No.: WO2010/087569
PCT Pub. Date: Aug. 5, 2010

(65) Prior Publication Data
US 2011/0287776 A1 Nov. 24, 2011

Related U.S. Application Data

(60) Provisional application No. 61/149,335, filed on Feb. 2, 2009, provisional application No. 61/151,809, filed on Feb. 11, 2009.

(51) Int. Cl.
*H04W 72/00* (2009.01)
(52) U.S. Cl. .................... 455/452.1; 370/329
(58) Field of Classification Search ....... 455/450–452.1; 370/329, 336, 431
See application file for complete search history.

(56) References Cited

U.S. PATENT DOCUMENTS

| | | | |
|---|---|---|---|
| 6,574,212 B1 | 6/2003 | Jurgensen et al. | |
| 2005/0186959 A1 | 8/2005 | Vialen et al. | |
| 2007/0064669 A1 | 3/2007 | Classon et al. | |
| 2007/0097909 A1* | 5/2007 | Khandekar et al. | 370/329 |
| 2007/0147310 A1 | 6/2007 | Cai | |
| 2007/0147326 A1 | 6/2007 | Chen | |
| 2008/0043671 A1 | 2/2008 | Moon et al. | |
| 2008/0043771 A1* | 2/2008 | Cho et al. | 370/431 |
| 2008/0096563 A1 | 4/2008 | Fischer et al. | |
| 2008/0101305 A1* | 5/2008 | Cave et al. | 370/336 |
| 2008/0139214 A1* | 6/2008 | Sun et al. | 455/450 |
| 2008/0225785 A1 | 9/2008 | Wang et al. | |
| 2008/0232283 A1 | 9/2008 | Jen | |
| 2008/0267126 A1 | 10/2008 | Vujcic et al. | |
| 2008/0267161 A1 | 10/2008 | Bertrand et al. | |

(Continued)

FOREIGN PATENT DOCUMENTS

| | | |
|---|---|---|
| EP | 2015594 | 1/2009 |
| WO | 2008/042889 | 4/2008 |

(Continued)

OTHER PUBLICATIONS

Zte, "Initial Uplink Access Procedure in LTE-Advanced", R1-090076, 3GPP TSG RAN WG1 Meeting #55bis, Jan. 2009, XP-050318020.

(Continued)

*Primary Examiner* — Jean Gelin
*Assistant Examiner* — Nathan Taylor
(74) *Attorney, Agent, or Firm* — Lee, Hong, Degerman, Kang & Waimey

(57) ABSTRACT

The present invention provides a method of determining capability of a UE, the method comprising: receiving an indication from a UE during a random access procedure, the indication enabling antennae capability of the UE to be determined; processing the indication in order to determine the number of antennae of the UE; and allocating resources to the UE according the antennae capability of the UE. The invention further relates to a user equipment and a network entity operable to implement such a method.

6 Claims, 9 Drawing Sheets

U.S. PATENT DOCUMENTS

2008/0316961 A1* 12/2008 Bertrand et al. .............. 370/329
2009/0011769 A1 1/2009 Park et al.

FOREIGN PATENT DOCUMENTS

WO 2008/050961 5/2008
WO 2008/050996 5/2008

OTHER PUBLICATIONS

Texas Instruments, "RACH Procedure for Asymmetric Carrier Aggregation", R1-090284, 3GPP TSG RAN WG1 #55bis, Jan. 2008, XP-050318208.

LG Electronics, "Initial Access Procedure in LTE-Advanced", R1-090210, 3GPP TSG RAN WG1 Meeting #55bis, Jan. 2009, XP-050318141.

NTT Docomo, "Initial Access Procedure for Asymmetric Wider Bandwidth in LTE-Advanced", R1-084249, 3GPP TSG RAN WG1 Meeting #55, Nov. 2008, XP-050317534.

Samsung Electronics, "Initial random access in asymmetric carrier aggregation", R1-090093, 3GPP TSG RAN WG1 Meeting #55bis, Jan. 2009, XP-050318036.

3rd Generation Partnership Project (3GPP), "Technical Specification Group Radio Access Network; Evolved Universal Terrestrial Radio Access (E-UTRA) Medium Access Control (MAC) protocol specification (Release 8)", 3GPP TS 36.321 V 8.4.0, Dec. 2008, XP-050377620.

LG Electronics, "Resolving downlink carrier amiguity with RACH", R1-090780, 3GPP TSG RAN WG1 #56, Feb. 2009, XP-050318638.

3rd Generation Partnership Project (3GPP), "Technical Specification Group Radio Access Network; Evolved Universal Terrestrial Radio Access (E-UTRA) Medium Access Control (MAC) protocol specification (Release 8)", 3GPP TS 36.321 V 8.3.0, Sep. 2008, XP-050377620.

Parkvall, et al., "LTE-Advanced-Evolving LTE towards IMT-Advanced", IEEE, Mar. 2008, 5 pages.

In the USPTO U.S. Appl. No. 13/147,358, Office Action dated Jan. 31, 2013, 15 pages.

* cited by examiner

DETERMINATION OF USER EQUIPMENT ANTENNA CAPABILITY

CROSS-REFERENCE TO RELATED APPLICATIONS

This application is a 371 U.S. national stage application of International Application No. PCT/KR2009/006647, filed on Nov. 12, 2009, which, pursuant to 35 U.S.C. §120, claims priority to U.S. Provisional Application Ser. Nos. 61/151,809, filed on Feb. 11, 2009, and 61/149,335, filed on Feb. 2, 2009, the contents of all of which are incorporated by reference herein in their entirety.

FIELD OF THE INVENTION

The present invention relates to a random access channel (RACH) procedure in a cellular communications network, and in particular to a method and apparatus for determining the capability of a user equipment. While it is described below in the context of a long term evolution (LTE) or long term evolution advanced (LTE-A) type cellular network for illustrative purposes and since it happens to be well suited to that context, those skilled in the art will recognise that the invention disclosed herein can also be applied to various other types of cellular networks.

DISCUSSION OF THE RELATED ART

A universal mobile telecommunications system (UMTS) is a 3rd Generation (3G) asynchronous mobile communication system operating in Wideband Code Division Multiple Access (WCDMA) based on a European standard known as Global System for Mobile Communications (GSM), and general packet radio services (GPRS). The LTE of UMTS is under discussion by the 3rd generation partnership project (3GPP) that standardised UMTS.

3GPP LTE is a technology for enabling high-speed packet communications. Many schemes have been proposed for the LTE objective including those that aim to reduce user and provider costs, improve service quality, and expand and improve coverage and system capacity. 3G LTE requires reduced cost per bit, increased service availability, flexible use of a frequency band, a simple structure, an open interface, and adequate power consumption of a terminal as an upper-level requirement.

FIG. 1 is a block diagram illustrating a network structure of an evolved universal terrestrial radio access system (E-UTRA). The E-UTRA may be also referred to as an LTE system. The communication network is widely deployed to provide a variety of communication services such as voice and packet data.

As illustrated in FIG. 1, the E-UTRA network includes an evolved terrestrial radio access network (E-UTRAN) and an evolved packet core (EPC) and one or more user equipments (UEs) 101. The E-UTRAN may include one or more evolved NodeBs (eNodeB, or eNB) 103, and a plurality of UEs 101 may be located in one cell. One or more E-UTRAN mobility management entity (MME)/system architecture evolution (SAE) gateways 105 may be positioned at the end of the network and connected to an external network.

As used herein, "downlink" refers to communication from an eNodeB 103 to a UE 101, and "uplink" refers to communication from the UE 101 to an eNodeB 103. UE 101 refers to communication equipment carried by a user and may be also be referred to as a mobile station (MS), a user terminal (UT), a subscriber station (SS) or a wireless device.

An eNodeB 103 provides end points of a user plane and a control plane to the UE 101. MME/SAE gateway 105 provides an end point of a session and mobility management function for UE 101. The eNodeB 103 and the MME/SAE gateway 105 may be connected via an S1 interface.

The eNodeB 103 is generally a fixed station that communicates with a UE 101, and may also be referred to as a base station (BS), a network entity or an access point. One eNodeB 103 may be deployed per cell. An interface for transmitting user traffic or control traffic may be used between eNodeBs 103.

The MME provides various functions including distribution of paging messages to eNodeBs 103, security control, idle state mobility control, SAE bearer control, and ciphering and integrity protection of non-access stratum (NAS) signalling. The SAE gateway host provides assorted functions including termination of U-plane packets for paging reasons, and switching of the U-plane to support UE mobility. For clarity, MME/SAE gateway 105 will be referred to herein simply as a "gateway," but it is understood that this entity includes both an MME and an SAE gateway.

A plurality of nodes may be connected between the eNodeB 103 and the gateway 105 via the S1 interface. The eNodeBs 103 may be connected to each other via an X2 interface and neighbouring eNodeBs may have a meshed network structure that has the X2 interface.

FIG. 2(a) is a block diagram depicting architecture of a typical E-UTRAN and a typical EPC. As illustrated, eNodeB 103 may perform functions of selection for gateway 105, routing toward the gateway during a radio resource control (RRC) activation, scheduling and transmitting of paging messages, scheduling and transmitting of broadcast channel (BCCH) information, dynamic allocation of resources to UEs 101 in both uplink and downlink, configuration and provisioning of eNodeB measurements, radio bearer control, radio admission control (RAC), and connection mobility control in LTE_ACTIVE state. In the EPC, and as noted above, gateway 105 may perform functions of paging origination, LTE-IDLE state management, ciphering of the user plane, system architecture evolution (SAE) bearer control, and ciphering and integrity protection of non-access stratum (NAS) signalling.

FIGS. 2(b) and 2(c) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The packet data convergence protocol (PDCP) layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 103 on the network side) may perform functions such as scheduling, automatic repeat request (ARQ), and hybrid automatic repeat request (HARQ). The PDCP layer (terminated in eNodeB 103 on the network side) may perform the user plane functions such as header compression, integrity protection, and ciphering.

As illustrated in FIG. 2(c), the RLC and MAC layers (terminated in an eNodeB 103 on the network side) perform the same functions as for the control plane. As illustrated, the RRC layer (terminated in an eNodeB 103 on the network side) may perform functions such as broadcasting, paging, RRC connection management, RB control, mobility functions, and UE measurement reporting and controlling. The NAS control protocol (terminated in the MME of gateway 105 on the network side) may perform functions such as an SAE bearer management, authentication, LTE_IDLE mobility handling, paging origination in LTE_IDLE, and security control for the signalling between the gateway and UE 101.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 101 may receive broadcasts of system information and paging information while the UE 101 specifies a discontinuous reception (DRX) configured by NAS, and the UE has been allocated an identification (ID) which uniquely identifies the UE in a tracking area. Also, in RRC-IDLE state, no RRC context is stored in the eNodeB 103.

In RRC_CONNECTED state, the UE 101 has an E-UTRAN RRC connection and a context in the E-UTRAN, such that transmitting and/or receiving data to/from the network (eNodeB) becomes possible. Also, the UE 101 can report channel quality information and feedback information to the eNodeB 103.

In RRC_CONNECTED state, the E-UTRAN knows the cell to which the UE 101 belongs. Therefore, the network can transmit and/or receive data to/from the UE 101, the network can control mobility (handover) of the UE 101, and the network can perform cell measurements for a neighbouring cell.

In RRC_IDLE mode, the UE 101 specifies the paging discontinuous reception (DRX) cycle. Specifically, the UE 101 monitors a paging signal at a specific paging occasion of every UE specific paging DRX cycle.

The procedure where a UE sends a first message to a network is commonly referred to as initial access. In most systems the initial access is initiated by a UE transmitting a connection request message including the reason of the request, and receiving an answer from the network indicating the allocation of radio resources for the requested reason.

In 3GPP TS 25.331 there are several reasons, referred to as establishment causes, for sending a connection request message. Establishment causes include: originating conversational/streaming/interactive/background/subscribed traffic call, terminating conversational/streaming/interactive/background call, emergency call, inter radio access technology (RAT) cell re-selection, inter-RAT cell change order, registration, detach, originating high/low priority signalling, call re-establishment and terminating high/low priority signalling.

An "originating call" establishment indicates that the UE 101 wishes to setup a connection, for instance a speech connection. A "terminating call" establishment indicates that the UE 101 answers to paging. A "registration" establishment indicates that the user wants to register only to the network.

To initiate access to the network a random access procedure is used. The physical random access transmission is under the control of higher layer protocol which performs some important functions related to priority and load control. These procedures differ in detail but GSM, UMTS and LTE radio systems have some similarities between them.

In the random access procedure the UE 101 randomly selects an access resource and transmits a RACH preamble to the network. A preamble is a short signal that is sent before the transmission of the RACH connection request message. The UE 101 can repeatedly transmit the preamble by increasing the transmission power each time the preamble is sent until the network indicates the detection of the preamble. The message part can then be sent at the level of power equal of the last preamble transmission power plus an offset signalled by the network.

A random access channel (RACH) is a common physical channel dedicated to the random access procedure. Uplink transmissions are generally initiated through a RACH. A UE sending data on a RACH has not yet been identified by the target eNB. RACH is typically an uplink common channel used for transmitting control information and user data. It is applied in random access, and used for low-rate data transmissions from the higher layer. Such a channel is said to be contention-based since many users can attempt to access the same base station simultaneously, leading to collisions. A RACH channel can be used for several purposes. For example the RACH can be used to access the network, to request resources, to carry control information, to adjust the time offset of the uplink in order to obtain uplink synchronisation, to adjust the transmitted power, etc.

A random access procedure can be launched by the UE or the eNodeB. It may, for instance, be triggered by the following events:

a UE switches from power-off to power-on and needs to be registered to the network.

a UE is not time-synchronized with a eNodeB and starts transmitting data (for instance the user calls).

a eNodeB starts transmitting data to the UE but they are not synchronized (for instance the user receives a call).

a eNodeB measures a delay of the received signal from the UE (for instance the user is moving and has lost synchronization).

a UE is moving from one cell to another and needs to be time-synchronized with a different target eNodeB than the serving eNodeB it is registered to (handover).

In LTE, the basic unit of time is a slot (generally of a duration of 0.5 ms). Two slots make up a subframe and ten subframes constitute a radio frame. A random access channel typically occupies 6 resource blocks in a subframe or set of consecutive subframes reserved for random access preamble transmissions. A RACH period can be configured to be, for example, 1 ms, 2 ms, 5 ms and 10 ms. FIG. 3 shows one possible mapping of the RACH within a resource grid.

FIG. 4 illustrates an example of the sequences of messages and responses exchanged between a user equipment UE 101 and a base station eNB 103 in a typical RACH procedure.

Firstly the UE 101 retrieves information transmitted periodically from eNB 103 on a downlink broadcast channel (BCH). The received information includes the available preamble signatures in the cell, the location and period of RACH time slots; From the received information the UE 101 selects a preamble signature, a RACH time slot and a frequency band. The preamble signature is chosen by the UE 101 from among a set of preamble signatures known by the eNB 103. The UE 101 generates a single random access burst containing the chosen preamble signature and transmits it to the eNB 103 over the selected time slot at the selected frequency in message 1.

The random access burst consists of a cyclic prefix, a preamble, and a guard time during which nothing is transmitted as illustrated in FIG. 5. CP denotes cyclic prefix, GT denotes guard time, RTD denotes round trip delay and TTI denotes transmission time interval.

The preamble is sent before a RACH connection request and indicates that the UE is about to transmit data. The random access burst is transmitted during one subframe. While the UE is not synchronized in the time domain, its random access burst may overlap with the next subframe and generate interference. A guard time may thus be added to combat interference. The guard time (GT) should be at least equal to the round-trip delay at the cell edge.

During the random access procedure, several users share the same channel. They are distinguishable by virtue of orthogonal sequences. These sequences are seen as the UE preamble signatures that can be transmitted simultaneously. A collision occurs whenever several users choose the same signature and send it within the same time and frequency resources.

The eNB 103 monitors the current RACH slot in an attempt to detect preambles transmitted from UEs in the corresponding cell.

On reception of a signal the eNB 103 correlates the received signal in the RACH sub-frame with all possible signatures. Detection of the preamble can be either performed in the time domain or in the frequency domain. A detection variable is computed for each signature. If the detection variable exceeds a certain threshold, the preamble is considered detected.

The eNB 103 sends a random access response to acknowledge the successfully detected preambles in message 2. This message is sent on a dedicated downlink channel and uses the detected signature. It contains a timing advance command, a power-control command. If the procedure is contention-free then the UE and the eNodeB are thereby aligned in the time domain.

If the UE 101 receives a response from the eNB 103 the UE 101 decodes the response and adapts its transmission timing, and its transmission power if the response contains power control information. The UE 101 then sends a resource request message—message 3—on a dedicated uplink channel. In this message, the UE requests bandwidth and time resources to transmit data and it also indicates a UE-specific identifier. If the UE requests resources, the UE 101 uses a specific ID in the message to resolve contentions. Then the UE monitors a specified downlink channel for response from the eNB. In the case of a positive resource grant, the subsequent transmissions are carried out as normal.

The eNB attempts to resolve any contentions. If the eNB 103 receives a resource request with a UE-specific signature the eNB 103 checks how many UEs were detected with the same signature and resolves any possible contentions. If the preamble sent by UE 101 was in collision with a preamble from another UE, the eNB 103 sends a contention resolution message—message 4—to give the command to UE 101 to re-start the RACH procedure. If on the other hand the UE 101 was not in collision, the eNB sends a resource assignment message—message 5. In this case the subsequent transmissions are carried out as usual. The eNB 103 identifies the UE 101 and assigns resources according to the scheduling rules applied.

In the random access response, message 2, the UE may receive an ACK signal from the eNB to indicate that a message can be sent, a NACK signal indicating that the preamble was detected but a message cannot to be sent, or no response indicating that the preamble was not detected.

In the case where UE 101 receives no response indicating that a preamble has not been detected at the first attempt the UE 101 waits for the next RACH slot to send another preamble. The preamble signal-to-noise ratio (SNR) is relatively low compared to data SNR owing to the length of the zero-correlation sequences. Given that the random access channel does not generate much interference, the UE can afford to increase the transmission power by a few decibels (dB) at the second attempt to prevent consecutive failures (power ramping method). A too long delay is not desirable, especially in the case of handovers. The UE 101 repeatedly transmits the preamble by increasing the transmission power every time the preamble is sent until the network indicates the detection of the preamble. The procedure is exited after a certain number of failures. If a preamble is successfully transmitted the message part is generally sent at the level of power equal to the last preamble transmission power plus an offset signaled by the network.

In LTE-A (Long Term Evolution-Advanced) communications MIMO (multiple input multiple output) is supported in the UL. Consequently, it would be useful for an eNode to be aware of whether or not a UE has UL MIMO capability when establishing communication with the UE.

Typically the UE radio access capability information is transferred from the UE to the network only if network initiates the procedure to a UE in RRC_CONNECTED mode. For LTE-A UEs however such procedures suffer drawbacks since the first UL-SCH/CCH transmissions can not exploit the benefits of MIMO transmissions.

SUMMARY OF THE INVENTION

According to a first aspect of the present invention there is provided a method of determining capability of a UE, the method comprising: receiving an indication from a UE during a random access procedure, the indication enabling antennae capability of the UE to be determined; processing the indication in order to determine the number of antennae of the UE; and allocating resources to the UE according the antennae capability of the UE.

Accordingly an eNB is able to determine the UE capability as early as possible in the communication between the eNb and the UE, i.e. via RACH procedure and to allocate the required resources to the UE according the detected UE capability.

According to a second aspect of the present invention there is provided a method of indicating capability of a UE, the method comprising: providing an indication enabling the antennae capability of the UE to be determined; and transmitting the indication during a random access procedure, to a network entity.

According to a third aspect of the present invention there is provided a network entity comprising: a transceiver for receiving an indication from a UE during a random access procedure, the indication enabling antennae capability of the UE to be determined; and a processor for processing the indication in order to determine the number of antennae of the UE; and allocating resources to the UE according the antennae capability of the UE.

According to a fourth aspect of the present invention there is provided a user equipment comprising a processor for providing an indication enabling the antennae capability of the UE to be determined; and a transceiver for transmitting the indication during a random access procedure, to a network entity.

In one embodiment of the invention the indication may be included in a first scheduled uplink transmission message on the uplink shared data channel received from the UE, the message being received after transmission of a random access response. This first scheduled uplink transmission message conveys the actual random access procedure message such as an RRC (Radio Resource Control) connection request, tracking area update.

In a further embodiment of the invention, the indication may be provided by a TC-RNTI.

In an even further embodiment of the invention, the indication may be provided by a preamble signature.

The methods according to the invention may be computer implemented. The methods may be implemented in software on a programmable apparatus. They may also be implemented solely in hardware or in software, or in a combination thereof.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION THE DRAWINGS

Embodiments of the invention will now be described, by way of example only, and with reference to the following drawings in which:—

FIG. 1 is a block diagram illustrating network structure of an E-UTRA (or LTE) system.

FIGS. 2(a), 2(b) and 2(c) are block diagrams depicting logic architecture of typical network entities of the LTE system (FIG. 2(a)), a user-plane (U-plane) protocol stack (FIG. 2(b)) and a control-plane (C-plane) protocol stack (FIG. 2(c)).

FIG. 3 graphically illustrates an example of the location of RACH slots in a 2.5 MHz bandwidth FIG. 4 is a diagram illustrating a typical RACH procedure FIG. 5 schematically illustrates a RACH preamble structure in E-UMTS FIG. 6 schematically illustrates an example of communication of UE antenna capability between a UE and an eNode FIG. 7 is a flow chart illustrating a method of determining transmission/reception capability of a UE according to a second embodiment of the present invention.

Figure 11:
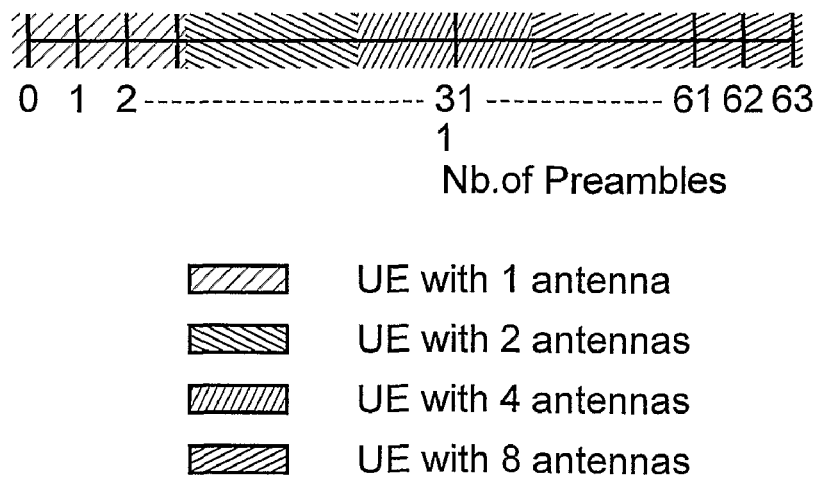

FIG. 11 schematically illustrates allocating preamble signatures of a according to the number of antenna of a UE according to an alternative embodiment of the invention.

DESCRIPTION OF PREFERRED EMBODIMENTS

Reference will now be made in detail to embodiments of the present invention, examples of which are illustrated in the accompanying drawings.

Figure 6:
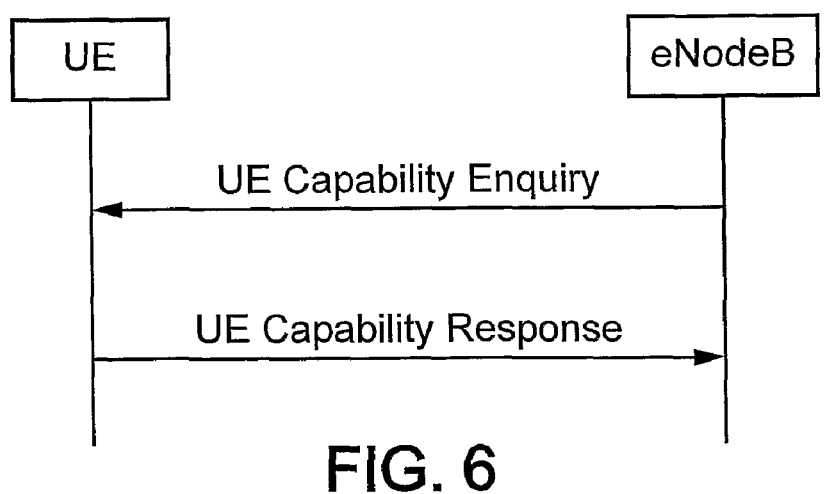

Embodiments of the present invention are directed to a RACH initial access procedure between a UE and an eNodeB. With reference to FIG. 6 in embodiments of the invention exchange of data between an UE 101 and eNodeB 103 enable eNodeB to be made aware of the transmission/reception capability of a UE.

Figure 1:
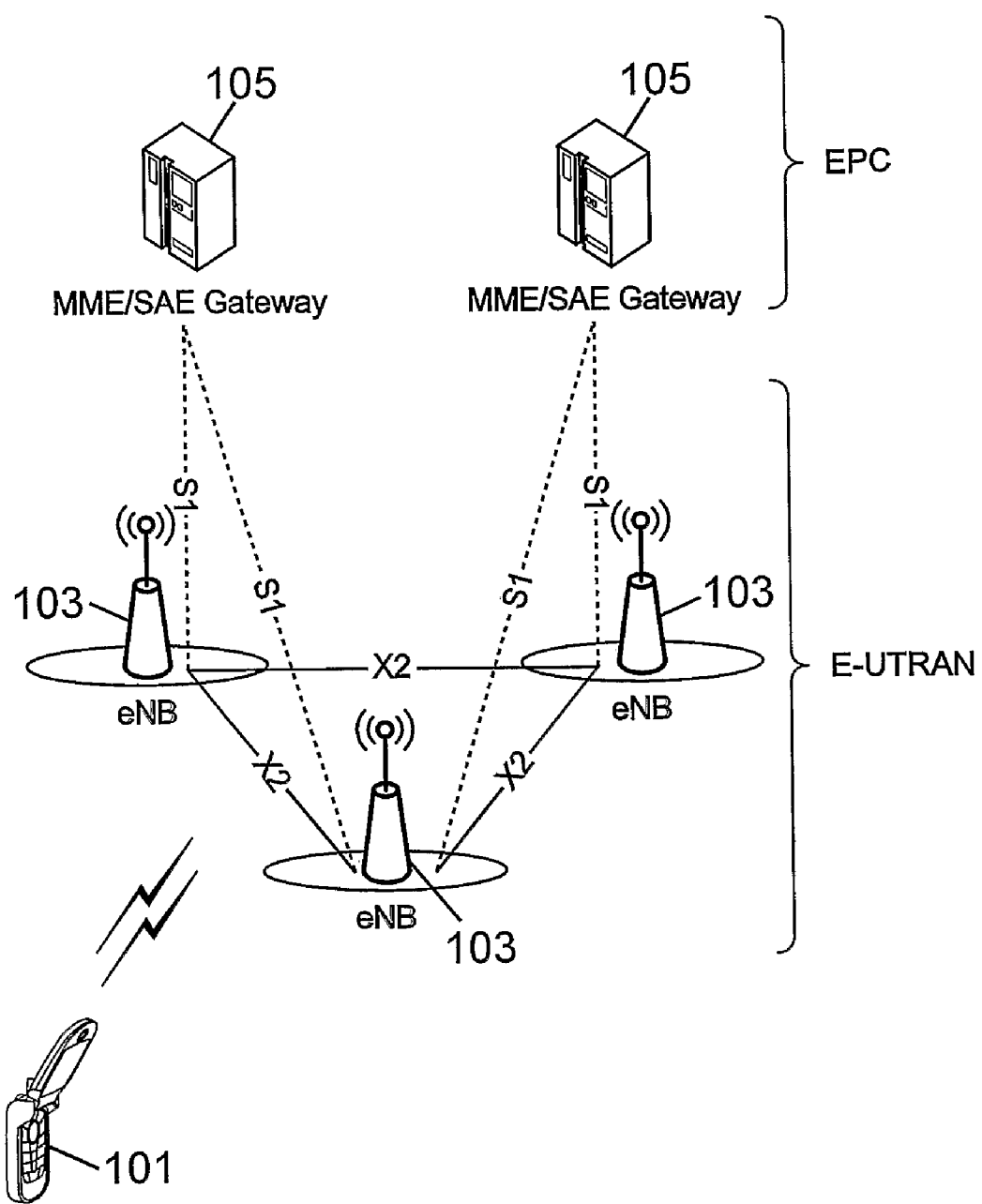
Figure 2A:
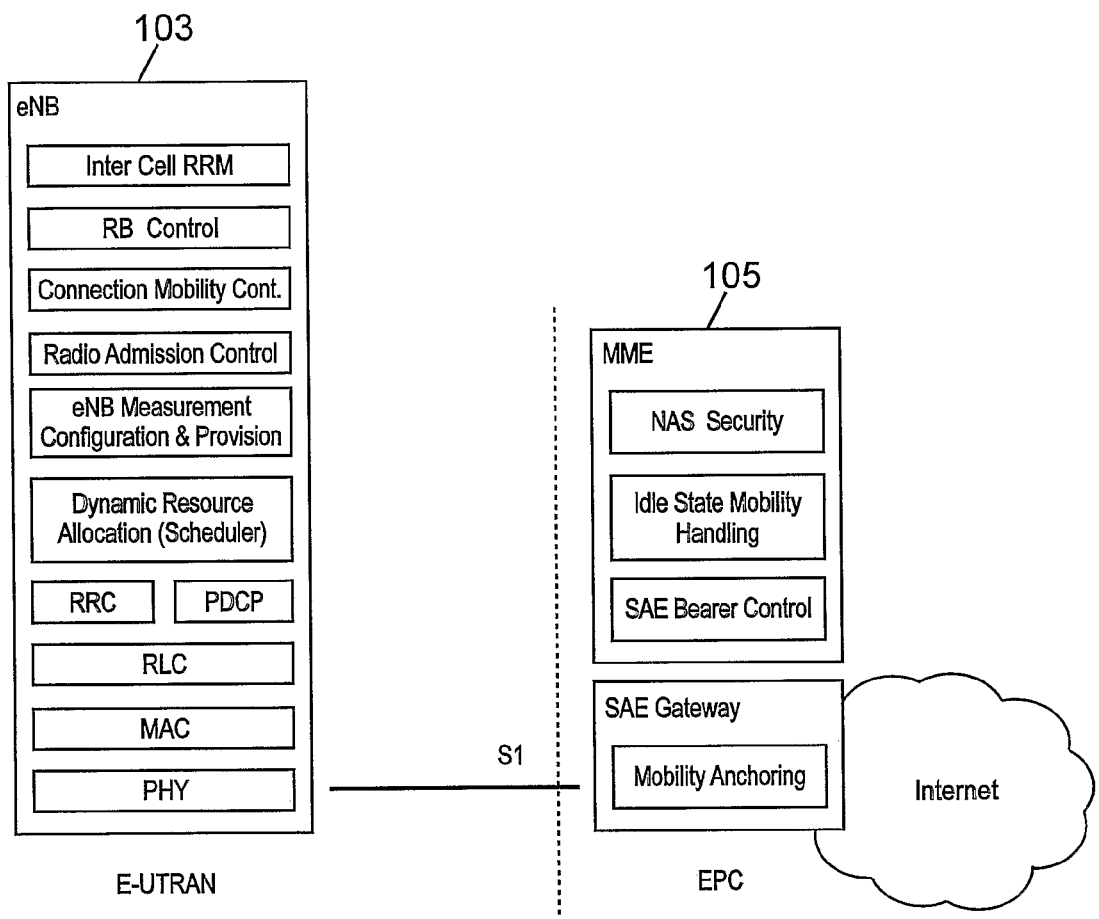
Figure 2B:
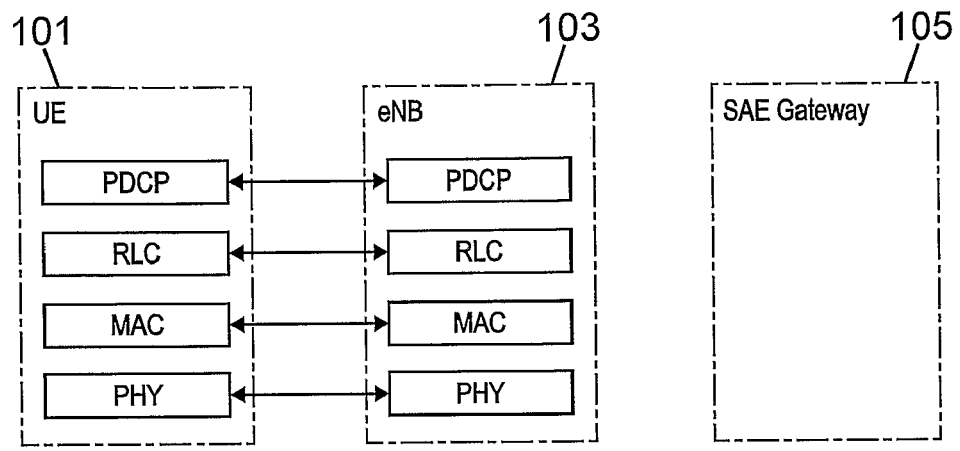
Figure 2C:
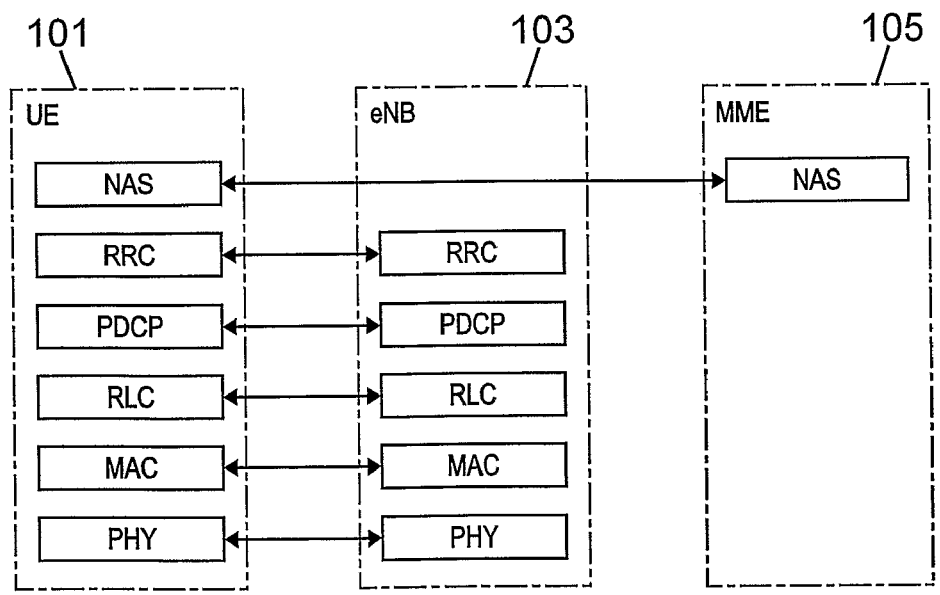
Figure 3:
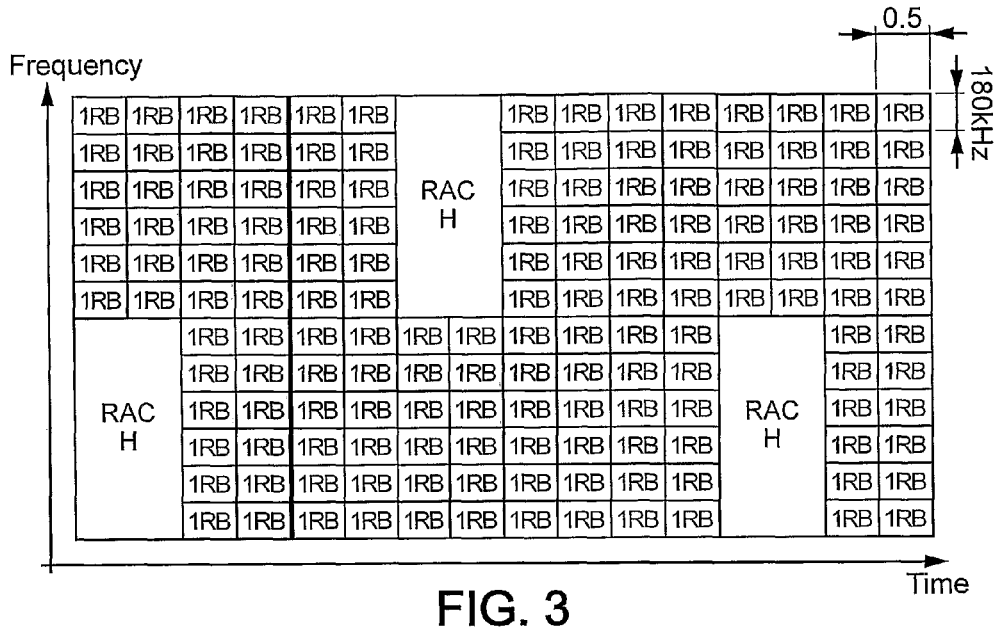
Figure 4:
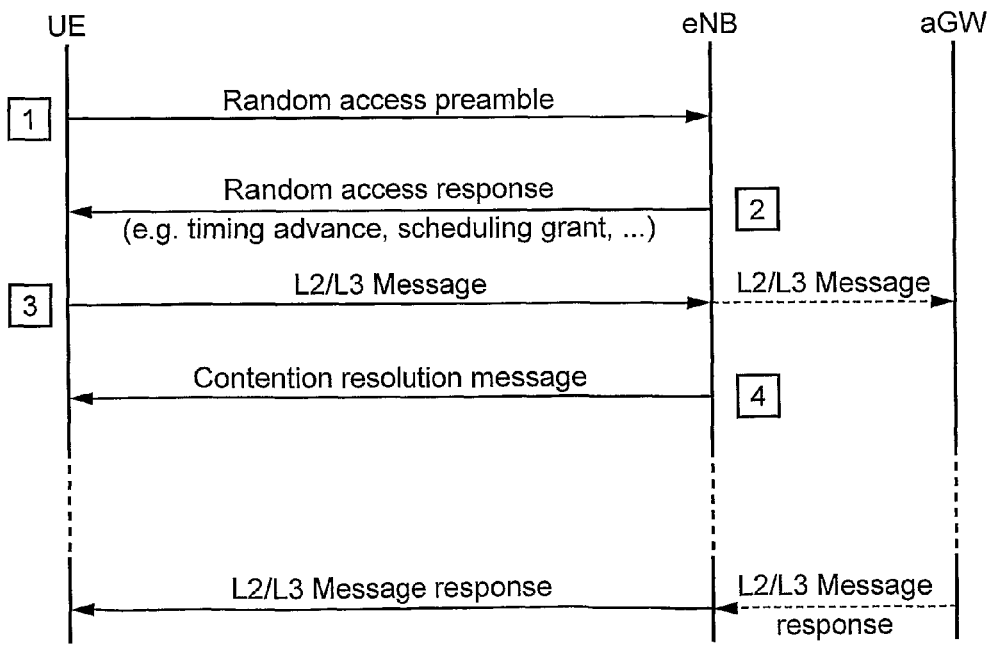
Figure 5:
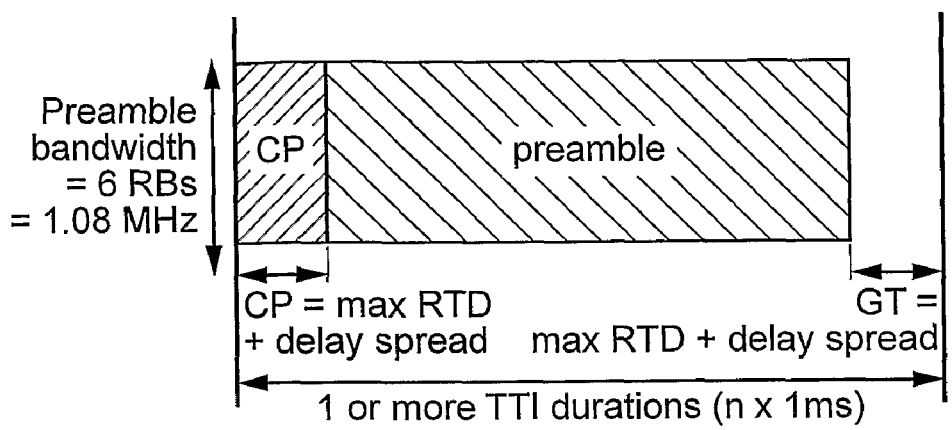

FIG. 4 illustrates an example of a random access procedure between a user equipment UE 101 and a base station eNodeB 103 according to embodiments of the present invention.

As described above the UE transmits a Random access preamble to the eNB in message 1 of the procedure prior to a RACH connection request. The eNB responds to the preamble by sending a Random Access Response to the UE to acknowledge a successfully detected preamble in message 2. Message 2 may contain timing advance information, power control information and an initial uplink resource grant for transmission of the message 3.

If the UE 101 receives a response from the eNB 103 the UE 101 decodes the response and adapts its transmission timing, and its transmission power if the response contains power control information. The UE 101 then sends a resource request message—message 3—on a granted uplink resources on a uplink shared data channel.

In the first embodiment of the invention message 3 includes UE UL MIMO capability in message 3. Since according to the LTE specification the maximum size of Msg3 size is not fixed, the message can include information on MIMO capability, for example the information on the number of uplink antennas of the UE. Since for example a maximum up to 8 uplink antennas may be foreseen for LTE-A UEs a message field with 3 bits can be added to the existing Msg3.

The eNode 103 is thereby made aware of the MIMO capability of the UE and can thus allocate the appropriate communication resources to the EU according to the detected UE capability.

In a second embodiment of the invention the indication of the antenna capability of the user equipment may be provided by means of a TC-RNTI (Temporary Cell Radio Network Temporary Identifier)

Figure 7:
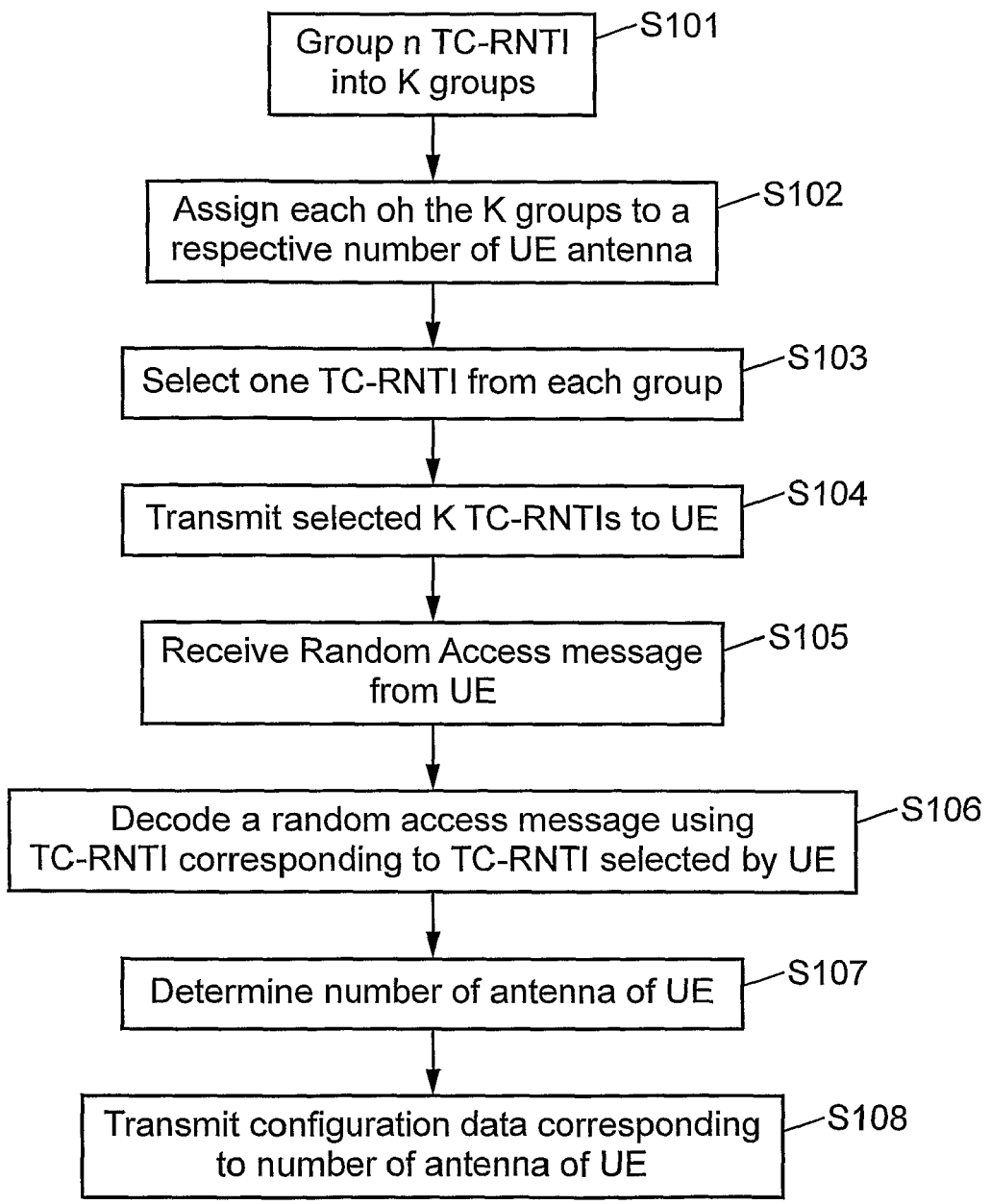
Figure 8:
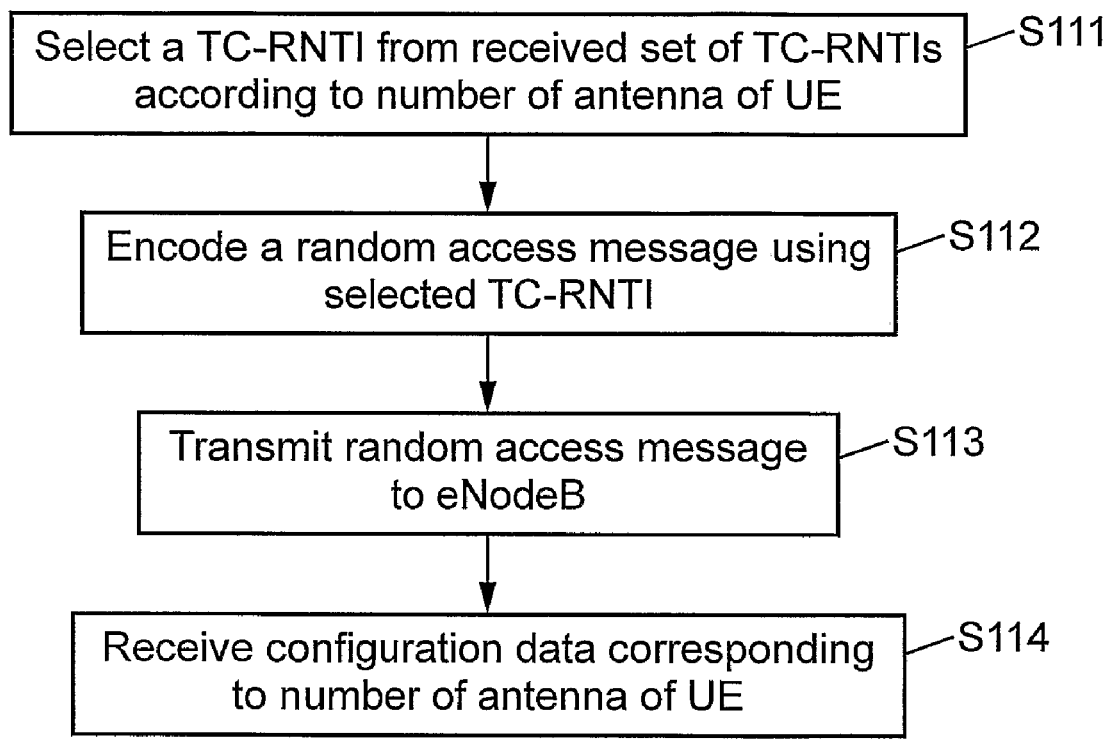
FIG. 8 is a flow chart illustrating a method of indicating transmission/reception capability of a UE according to a second embodiment of the present invention.

With reference to FIGS. 7 and 8, in this embodiment of the invention a number n of TC-RNTIs are grouped into k groups in step S101. Each group corresponds to a number of antennas of the User equipment 101 S102. An example of such grouping is illustrated in table 1

TABLE 1

| Group | TC-RNTI range | Number of UE antennas |
|---|---|---|
| A | 60-1024 | 1 |
| B | 1025-2048 | 2 |
| C | 2049-4096 | 3 |

TABLE 1-continued

| Group | TC-RNTI range | Number of UE antennas |
|---|---|---|
| D | 4097-8192 | 4 |
| E | 8192-65535 | 8 |

At least one TC-RNTI from each group of the k groups is selected—S103. In the example illustrated in Table 1, 5 TC-RNTIs, one from each group A, B, C, D and E will be selected for transmission to the UE. Radio resources are also allocated corresponding to each of the selected TC-RNTIs.

With reference to FIG. 4 the UE 101 transmits a Random access preamble to the eNB in message 1 of the procedure prior to a RACH connection request. In the random access response, message 2, the network entity eNB 103 transmits the selected set of k TC-RNTIs to the UE—step S104.

The UE 101 can be made aware of grouping in the table above either by BCH signaling or by fixed grouping in the specification. The UE selects the corresponding TC-RNTI from the received group of TC-RNTIs—S111 according to the number of antennas it is provided with. The random access message Msg3 to be sent by the UE 101 to the eNB 103 is scrambled by the selected TC-RNTI—step S112 and sent in step S113

The eNB 103 by descrambling the Msg3 in step S106 can determine the number of antenna of the UE S107. The E Node can then assign the adequate resources for MIMO or no MIMO transmission and transmit appropriate configuration data corresponding to the number of antenna supported by the UE 101 in step S108. Thus in step S114 the UE receives configuration data corresponding to the number of its antenna—its MIMO capability.

In a third embodiment of the invention the indication of UE antenna capability is provided by a preamble signature.

Preamble signatures should portray good autocorrelation properties in order for the eNodeB 103 to obtain an accurate timing estimation for a single preamble; and good cross correlation properties in order for the eNodeB 103 to obtain an accurate timing estimation for different preambles transmitted simultaneously by different UEs.

The Zadoff-Chu Zero Correlation Zone (ZC-ZCZ) sequences are used to fulfil these requirements. Each cell possesses a set of 64 signatures obtained from ZC-ZCZ sequences. The length of one sequence is N=839 samples. A ZC-ZCZ sequence is defined by two integers: u is the root index and v is the cyclic shift index.

In the time domain, the v-th cyclic shift is extracted from the u th root with:

$$x_{u,v}(n) = x_u(n + v \cdot N_{CS}) n = 0 \ldots N-1$$

where $N_{CS}$ is the cyclic shift length.

The u-th root sequence in the frequency domain is given by:

$$x_u(n) = e^{i\pi \cdot u \cdot \frac{n(n+1)}{N}}$$

The ZC-ZCZ sequences are used because they can generate a large number of sequences and they offer interesting correlation properties: the autocorrelation function shows no side peaks. The cross correlation between two sequences obtained from different roots is $\sqrt{N}$. Thus ZC sequences have zero-cross-correlation zones.

In the third embodiment of the invention a set of preamble signatures can be allocated for LTE UEs and another set of preambles can be allocated to LTE-A UEs, for example. The set of LTE-A UEs can then be further divided into groups in order to differentiate the number of antennas. The preamble signature grouping can be configurable and broadcasted on BCH.

Figure 9:
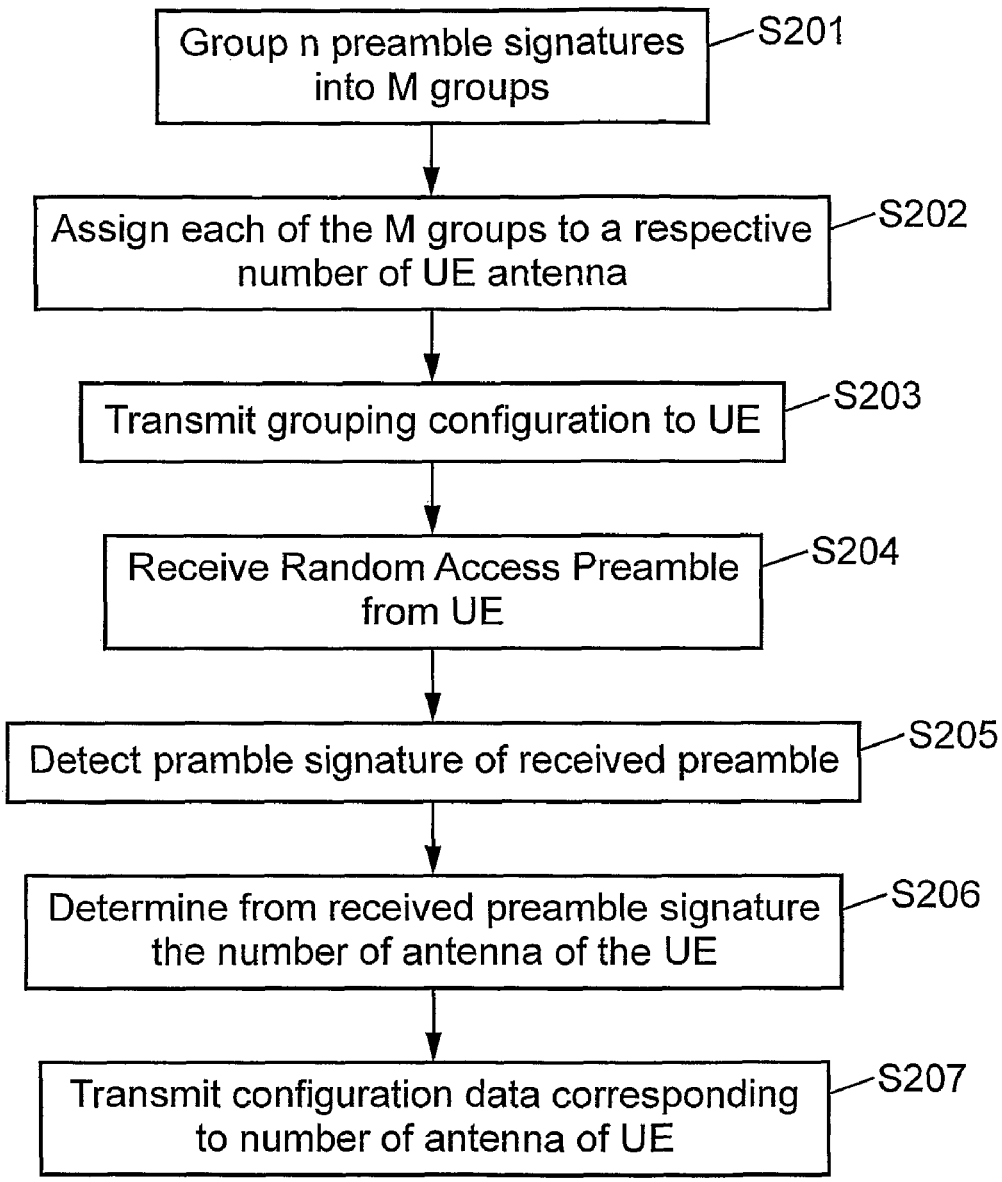
FIG. 9 is a flow chart illustrating a method of determining transmission/reception capability of a UE according to a third embodiment of the present invention.
Figure 10:
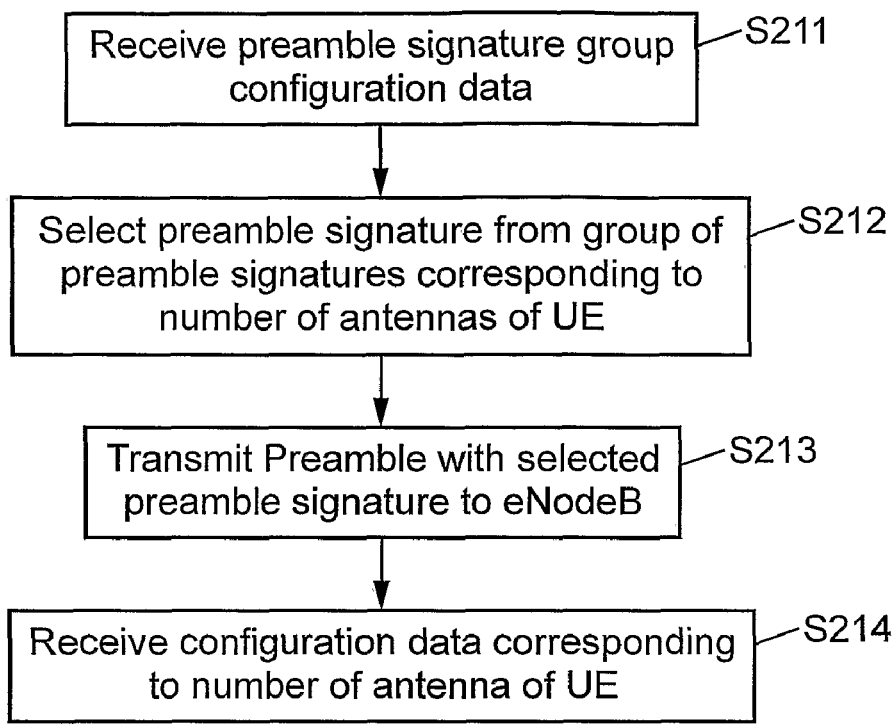
FIG. 10 is a flow chart illustrating a method of indicating transmission/reception capability of a UE according to a third embodiment of the present invention.

With reference to FIGS. 9 and 10 in step S201 N preamble signatures are grouped into M groups. Each of the M groups are assigned to a respective number of UE antenna in step S202

For instance the N signatures can be assigned only for UEs with 1 antenna (note that in this case there would be no need to differentiate LTE UEs from LTE-A UEs). While another X signatures would be assigned for UEs with 2 operable antennas and so on. An illustrative example of preamble signature grouping is shown as FIG. 11 In this example a set of 64 preamble signatures is split into four preamble signature groups. A first group of preamble signatures is assigned for one antenna capability, a second group of preamble signatures is assigned for two antenna capability, a third group of preamble signatures is assigned for four antenna capability, and a fourth group of preamble signatures is assigned for four antenna capability, The grouping configuration is broadcast to the UE on BCH—step S203 and S211. In step S212 the UE selects a preamble signature from the group of preamble signatures corresponding to the number of antenna it has. In step S213 a preamble with the selected preamble signature is transmitted from the UE 101 to the eNodeB 103. In step S205 the enodeB 103 detects the preamble signature of the received preamble. In step s206 from the received preamble signature the eNodeB 103 can determine from which group the preamble signature has been selected and thus the corresponding number of antennas of the UE 101.

Therefore according to the detected preamble signature the network can allocate in MsG2 OF FIG. 4 adequate resource for MIMO or no MIMO according to the number of determined antenna and transmit the configuration data to the UE in step S207. This may be done prior to the transmission of a random access message Msg3 of FIG. 4. Accordingly the transmission of the random access message Msg 3 can benefit from MIMO capability of the UE and the UE is able to support transmission of a random access message Msg3 of an increased size than in LTE. Cell coverage may also be increased since LTE coverage is limited by the RACH coverage.

Embodiments of the invention thereby enable a network to determine capability of a UE as early as possible i.e. during the RACH procedure and thereby enables the network to allocate the required radio resources to the UE according to its UE antenna capability.

While embodiments of the present invention has been hereinbefore described in relation to the illustrative case of a 3GPP LTE or LTE-A system, those skilled in the wireless communication art will appreciate that the invention is applicable to communications systems other than 3GPP LTE or LTE-A systems.

Many further modifications and variations will suggest themselves to those versed in the art upon making reference to the foregoing illustrative embodiments, which are given by way of example only and which are not intended to limit the scope of the invention, that being determined solely by the appended claims.

The invention claimed is:

1. A method of at a network determining capability of a User Equipment (UE), the method comprising:
   receiving a preamble signal from the UE for a random access procedure;

transmitting a random access response including a set of Temporary Cell—Radio Network Temporary Identifiers (TC-RNTI), to the UE after receiving the preamble signal;

receiving a random access message from the UE that is scrambled by a specific TC-RNTI included in the set of TC-RNTI, the specific TC-RNTI associated with a number of antennae of the UE; and allocating resources to the UE according to the number of antennae of the UE, wherein the set of TC-RNTI is configured to include one or more TC-RNTI selected from each of a plurality of groups of TC-RNTI range corresponding to the number of antennae of the UE.

2. The method according to claim 1, further comprising: grouping a number n of TC-RNTI into k groups of TC-RNTI range corresponding to the number of antennae.

3. The method according to claim 2, further comprising: decoding the random access message using the specific TC-RNTI.

4. A method of a User Equipment (UE) indicating capability to a network, the method comprising:

transmitting a preamble signal to the network for a random access procedure;

receiving a random access response including a set of Temporary Cell—Radio Network Temporary Identifiers (TC-RNTI), from the network after transmitting the preamble signal;

selecting a specific TC-RNTI from the set of TC-RNTI according to a number of antennae of the UE;

scrambling a random access message using the selected specific TC-RNTI;

transmitting the random access message scrambled by the selected specific TC-RNTI to the network, the selected specific TC-RNTI associated with the number of antennae of the UE; and receiving information from the network that is related to resources allocated to the UE, wherein the resources are allocated based on the number of antennae of the UE, wherein the set of TC-RNTI is configured to include one or more TC-RNTI selected from each of a plurality of groups of TC-RNTI range corresponding to the number of antennae of the UE.

5. A network entity comprising:

a transceiver for receiving a preamble signal from a User Equipment (UE) for a random access procedure, transmitting a random access response to the UE that includes a set of Temporary Cell—Radio Network Temporary Identifiers (TC-RNTI) after receiving the preamble signal, and receiving a random access message from the UE that is scrambled by a specific TC-RNTI included in the set of TC-RNTI; and a processor for allocating resources to the UE according to the number of antennae of the UE, wherein the set of TC-RNTI is configured to include one or more TC-RNTI selected from each of a plurality of groups of TC-RNTI range corresponding to the number of antennae of the UE, and wherein the specific TC-RNTI is associated with the number of antennae of the UE.

6. A user equipment (UE) comprising:

a transceiver for transmitting a preamble signal to a network for initiating a random access procedure and receiving a random access response that includes a set of Temporary Cell—Radio Network Temporary Identifiers (TC-RNTI) after transmitting the preamble signal; and a processor for selecting a specific TC-RNTI from the set of TC-RNTI according to a number of antennae of the UE and scrambling a random access message using the selected specific TC-RNTI, wherein the transceiver transmits the random access message scrambled by the selected specific TC-RNTI to the network and receives information from the network that is related to resources allocated to the UE, wherein the resources are allocated based on the number of antennae of the UE, and wherein the set of TC-RNTI is configured to include one or more TC-RNTI selected from each of a plurality of groups of TC-RNTI range corresponding to the number of antennae of the UE.

* * * * *